(12) United States Patent
Gysling et al.

(10) Patent No.: US 11,307,075 B2
(45) Date of Patent: Apr. 19, 2022

(54) APPARATUS AND METHOD FOR DECREASING VIBRATIONAL SENSITIVITY OF STRAIN-BASED MEASUREMENTS OF FLUID FLOW PARAMETERS FOR A FLUID FLOW WITHIN A CONDUIT

(71) Applicant: Expro Meters, Inc., Wallingford, CT (US)

(72) Inventors: Daniel L. Gysling, South Glastonbury, CT (US); Gabriel Dragnea, Denver, CO (US); Siddesh Sridhar, Newington, CT (US)

(73) Assignee: Expro Meters, Inc., Wallingford, CT (US)

( * ) Notice: Subject to any disclaimer, the term of this patent is extended or adjusted under 35 U.S.C. 154(b) by 139 days.

(21) Appl. No.: 16/825,559

(22) Filed: Mar. 20, 2020

(65) Prior Publication Data

US 2021/0293596 A1 Sep. 23, 2021

(51) Int. Cl.
*G01F 1/84* (2006.01)

(52) U.S. Cl.
CPC ............ *G01F 1/845* (2013.01); *G01F 1/8413* (2013.01)

(58) Field of Classification Search
CPC .... G01F 1/8404; G01F 1/8409; G01F 1/8418; G01F 1/845
See application file for complete search history.

(56) References Cited

U.S. PATENT DOCUMENTS

2005/0120799 A1 6/2005 Gysling
2008/0189057 A1 8/2008 Perry
2011/0056298 A1 3/2011 O'Keefe

OTHER PUBLICATIONS

Felix et al. "Non-Intrusive Array-Based Technology and its Application to Iron Ore Processing Flow Measurements", Iron Ore and Manganese Ore Metallurgy Conference, Sep. 7, 2011, http://45.55.61.46/sites/default/files/document_library/BI0444_Iron_Ore_2011_Final_Tech_Paper.pdf.
International search report for PCT/US2021/022796 dated Jun. 29, 2021.

*Primary Examiner* — Erika J Villaluna
(74) *Attorney, Agent, or Firm* — Getz Balich LLC (57) ABSTRACT

An apparatus and method of decreasing vibrational sensitivity of strain based measurements of fluid flow parameters for a fluid flow in a conduit is provided. The method includes using at least one vibrational sensor to sense a conduit to determine vibrational characteristics of the conduit, determining a predominant elastic axis using the measured vibrational characteristics, and securing a strain sensor array to an outer surface of the conduit, the strain sensor array having a plurality of strain sensors disposed at different axial positions of the conduit, the strain sensor array secured to the outer surface of the conduit at a position so that the strain sensor array is oriented substantially symmetric to the determined predominant elastic axis.

20 Claims, 7 Drawing Sheets

APPARATUS AND METHOD FOR DECREASING VIBRATIONAL SENSITIVITY OF STRAIN-BASED MEASUREMENTS OF FLUID FLOW PARAMETERS FOR A FLUID FLOW WITHIN A CONDUIT

BACKGROUND OF THE INVENTION

1. Technical Field

The present disclosure relates to devices and methods for sensing a process fluid parameter in a pipe in general, and to devices and methods for decreasing vibrational sensitivity of strain-based sensors used to sense a process fluid parameter in a pipe in particular.

2. Background Information

It is known to use an array of strain sensors to sense a fluid flow passing within a conduit; e.g., see U.S. Pat. Nos. 6,862,920; 6,813,962; 7,058,549; 7,062,976; 7,121,152; 7,127,360; and 7,165,464. The conduit, typically in the form of a pipe, has a circumferentially extending wall defined by an inner diameter surface and an outer diameter surface. The inner diameter surface defines an inner fluid flow passage. An array of strain sensors can be used to measure the speed at which coherent disturbances convect within the fluid flow traveling within the pipe, which parameter in turn can be used to determine fluid flow parameters such as the bulk fluid velocity of the flow and/or the volumetric rate of the flow. An array of strain sensors can also be used to measure the speed at which long wavelength acoustic disturbances (i.e., where the wavelength is long compared to the cross-sectional dimensions of the conduit) propagate within a fluid flow to determine the speed of sound (SOS) of the fluid flow. The SOS within the fluid flow can be used to determine compositional information about the fluid flow, such as an entrained gas level and/or other compositional information.

The array of strain sensors is typically applied (directly or indirectly) to the outer surface of the pipe. Within the array, the strain sensors are typically located at known relative axial positions (e.g., at least one sensor disposed at different axial positions). In those instances where the array includes more than two axial sensor positions, the sensor positions may be equidistant from one another (e.g., $X_1, X_2 \ldots, X_N$, where "N" is an integer, and each axial position is separated from an adjacent axial position by the distance X). The array of strain sensors may be clamped to the outer surface of the pipe by a clamping device.

Figure 1:
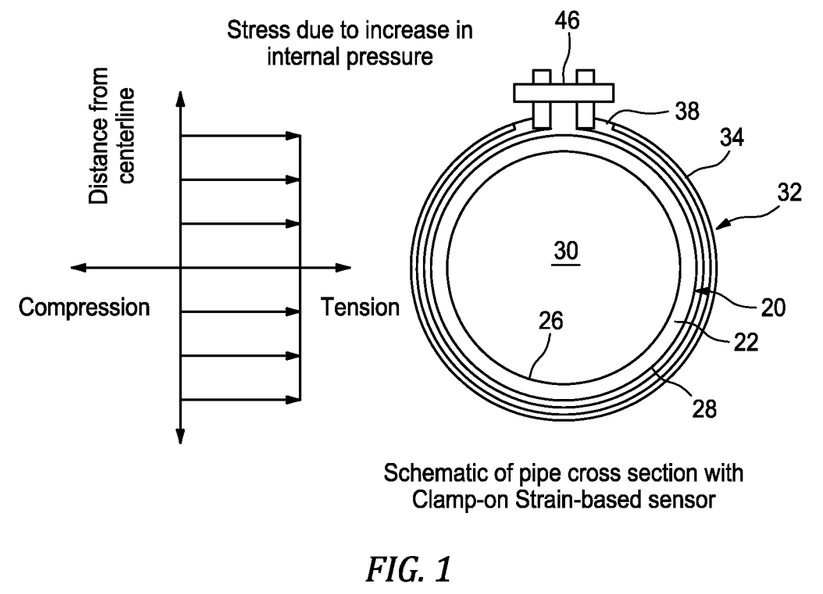
FIG. 1 is a diagrammatic illustration of a pipe subject to internal pressure fluctuations.

FIG. 1 diagrammatically illustrates a strain sensor clamped to the outer diameter surface of a pipe operable to measure strain in the pipe wall. Strain in the pipe wall associated with a change in the pressure across the pipe wall is assumed to be circumferentially uniform and linearly proportional to variations in the pressure differential across the pipe wall. A difference in pressure across the pipe wall may not, however, be the only source of strain within the pipe wall. Structural vibrations, for example, can produce strain within a pipe wall. Many piping networks have numerous low frequency structural modes of vibration primarily associated with transverse bending of the fluid conduit. Strain resulting from structural vibrations is not representative of internal pressure fluctuations within the pipe.

A strain sensor that measures a full circumferential average of the strain field at each axial sensing position on the pipe is preferred. The bending strain in an axisymmetric pipe is essentially symmetric about an elastic axis. A strain sensor that measures a full circumferential average of the strain field is therefore nominally orthogonal to any bending vibration in a conduit with a symmetric cross section, such as a pipe. In an ideal configuration, therefore, the net strain measured by such an axisymmetric strain sensor for a bending vibration would approach zero and sensed strain associated with the bending vibration (i.e., "noise" in terms of determining the propagating pressure fields within the fluid) would be greatly decreased or eliminated.

Most strain sensor arrays, however, do not sense the entire circumference of a pipe and also use a clamping mechanism that is not circumferentially symmetric. The clamping mechanism may make the strain sensors within the array non-axisymmetric, and depending on the orientation of the clamping mechanism to the elastic axis of any given bending vibration, can increase the sensitivity of the strain sensor to structural vibration and thereby impair the measurement of fluid parameters within the pipe.

What is needed is a method and apparatus that can account for pipe wall stress associated with vibration-produced pipe wall stress, and minimize or avoid error associated therewith.

SUMMARY

According to an aspect of the present disclosure, a method of decreasing vibrational sensitivity of strain based measurements of fluid flow parameters for a fluid flow in a conduit is provided. The method includes: using at least one vibrational sensor to sense a conduit to determine vibrational characteristics of the conduit; determining a predominant elastic axis using the measured vibrational characteristics; and securing a strain sensor array to an outer surface of the conduit, the strain sensor array having a plurality of strain sensors disposed at different axial positions of the conduit, the strain sensor array secured to the outer surface of the conduit at a position so that the strain sensor array is oriented substantially symmetric to the determined predominant elastic axis.

In any of the aspects or embodiments described above and herein, the strain sensor array may be secured to the outer surface of the conduit using a clamp device, and the method may further include circumferentially orienting the clamp device relative to the conduit at a position so that the clamp device is substantially symmetric to the determined predominant elastic axis.

In any of the aspects or embodiments described above and herein, the clamp device may be asymmetric and the asymmetry of the clamp device may be positioned substantially symmetric to the determined predominant elastic axis.

In any of the aspects or embodiments described above and herein, the at least one vibrational sensor may include an accelerometer.

In any of the aspects or embodiments described above and herein, the vibrational characteristics may include bending vibrations.

In any of the aspects or embodiments described above and herein, the step of determining the predominant elastic axis may include producing a visual display of a plot of the vibrational characteristics.

In any of the aspects or embodiments described above and herein, the conduit may be a cylindrical pipe.

In any of the aspects or embodiments described above and herein, the vibrational characteristics of the conduit may be sensed at a first point in time and form a first set of vibrational characteristics, and the predominant elastic axis may be determined using the first set of vibrational characteristics, and the method may further include using the at least one vibrational sensor to sense the conduit to determine a second set of vibrational characteristics of the conduit, the second set of vibrational characteristics sensed at a second point in time, which second point in time is later than the first point in time, and determining a second predominant elastic axis using the second set of vibrational characteristics sensed at a second point in time, and comparing the second set of vibrational characteristics to the first set of vibrational characteristics.

In any of the aspects or embodiments described above and herein, the method may further include reporting a difference between the second set of vibrational characteristics and the first set of vibrational characteristics.

In any of the aspects or embodiments described above and herein, the method may further include comparing the second predominant elastic axis to the predominant elastic axis.

In any of the aspects or embodiments described above and herein, the method may further include reporting a difference between the second predominant elastic axis and the first predominant elastic axis.

According to another aspect of the present disclosure, an apparatus for measuring one or more fluid flow parameters for a fluid flow in a conduit is provided. The apparatus includes one or more vibrational sensors and a fluid flow sensing device. The one or more vibration sensors may be configured to sense a conduit to determine vibrational characteristics of the conduit. The fluid flow sensing device has a strain sensor array configured to be secured to an outer surface of the conduit, the strain sensor array having a plurality of strain sensors disposed at different axial positions of the conduit. The strain sensor array is secured to the outer surface of the conduit at a position so that the strain sensor array is oriented substantially symmetric to an elastic axis of the vibrational characteristics of the conduit.

In any of the aspects or embodiments described above and herein, the elastic axis is a predominant elastic axis of the vibrational characteristics of the conduit.

In any of the aspects or embodiments described above and herein, the apparatus may include an asymmetric clamp device configured to secure the strain sensor array the outer surface of the conduit. The asymmetric clamp device is positioned relative to the conduit at a position so that the asymmetry of the clamp device is substantially symmetric to the determined predominant elastic axis.

In any of the aspects or embodiments described above and herein, the apparatus further includes a display device configured to produce a visual display of a plot of the vibrational characteristics.

According to another aspect of the present disclosure, an apparatus for measuring one or more fluid flow parameters for a fluid flow in a conduit is provided. The apparatus includes one or more vibration sensors, a processing unit, and a fluid flow sensing device. The one or more vibration sensors are configured to sense a conduit to determine vibrational characteristics of the conduit. The processing unit is in communication with the one or more vibration sensors and a memory device storing instructions, the instructions when executed cause the processing unit to determine a predominant elastic axis based on the determined vibrational characteristics. The fluid flow sensing device has a strain sensor array configured to be secured to an outer surface of the conduit. The strain sensor array has a plurality of strain sensors disposed at different axial positions of the conduit. The strain sensor array is secured to the outer surface of the conduit at a position so that the strain sensor array is oriented substantially symmetric to the predominant elastic axis.

In any of the aspects or embodiments described above and herein, the apparatus further includes an asymmetric clamp device configured to secure the strain sensor array the outer surface of the conduit. The asymmetric clamp device is positioned relative to the conduit at a position so that the asymmetry of the clamp device is substantially symmetric to the determined predominant elastic axis.

In any of the aspects or embodiments described above and herein, the vibrational characteristics of the conduit and the predominant elastic axis are stored in the memory device. The instructions when executed cause the processor to: control the one or more vibrational sensors to sense the conduit to determine second vibrational characteristics of the conduit and store the second vibrational characteristics in the memory device; determine a second predominant elastic axis based on the determined second vibrational characteristics; compare the determined predominant elastic axis to the second predominant elastic axis, or compare the determined vibrational characteristics to the second vibrational characteristics, or both, and report a first result of the comparison between the determined predominant elastic axis and the second predominant elastic axis, or a second result of the comparison between the determined vibrational characteristics and the second vibrational characteristics, or both.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Referring to FIG. 1, unsteady pressure variations (e.g., resulting from vortical disturbances and/or acoustic waves and/or other sources traveling within the fluid flow) are known to travel within fluid flow passing within a pipe 20. These unsteady pressure variations can be sensed and used to determine fluid flow parameters. Pressure variations can produce a change in pressure across the pipe wall 22, which change in turn can produce strain within the pipe wall 22. A difference in pressure across the pipe wall 22 may not, however, be the only source of strain within the pipe wall 22. Structural vibrations of a pipe 20 (e.g., bending vibrations), for example, can produce strain within a pipe wall 22. Many piping networks have numerous low frequency structural modes of vibration primarily associated with transverse bending of the fluid conduit. Specific bending vibrations will have an elastic axis, with the elastic axis being defined an axis through a cross section of the conduit through which the bending stain is zero. In most instances, a pipe within a piping system will be subject to a plurality of different bending vibrations, each with an elastic axis. As will be explained herein, the various different bending vibrations may be considered collectively, with a predominant elastic axis for the collective bending vibrations. Strain resulting from structural vibrations is not representative of internal pressure fluctuations within the pipe 20. If structural vibration induced strain measured by the strain-based sensor is sufficiently large, the interpretation of fluid flow parameters determined from the sensed strain may be impaired. As will be described below, embodiments of the present disclosure provide a system and methodology for addressing pipe wall strain associated with transverse bending vibrations of the pipe and not associated with pressure fluctuations.

Figure 2:
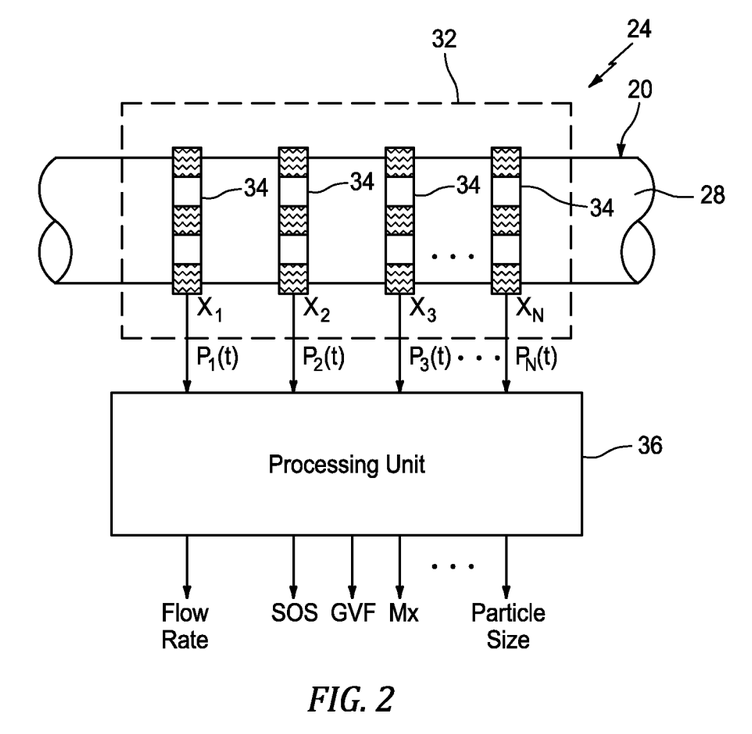
FIG. 2 is a diagrammatic illustration of a fluid flow sensing device having an array of sensors disposed along a pipe for measuring a parameter of a fluid flowing in the pipe.

Referring to FIG. 2, the fluid flow sensing device 24 is configured to sense fluid flow passing through the pipe 20 by sensing strain within the wall 22 of the pipe. The circumferentially extending pipe wall 22 is defined by an inner diameter surface 26 and an outer diameter surface 28. The inner diameter surface 26 defines an inner fluid flow passage 30. The present disclosure is not limited to cylindrical pipes, and may be utilized with fluid conduits other than cylindrical pipes. The fluid flow sensing device 24 includes an array 32 of strain sensors 34 disposed on the outer diameter surface 28 of the pipe wall 22. The array 32 includes strain sensors 34 spaced apart from one another at two or more axial positions along the outer surface 28 of the pipe 20. The strain sensors essentially average the strain field over which the strain sensor extends, if the strain sensor extends the full circumference of the pipe, the strain sensor is assumed to measure a strain signal that is essentially linearly proportional to variations in the pressure differential across the pipe. The sensor array 32 embodiment shown in FIG. 2, is a non-limiting example that includes strain sensors 34 disposed at a plurality of axial positions (i.e., $X_1$, $X_2$, $X_3$ . . . $X_N$). Each axial position of the array 32 may include one or more strain sensors 34. The fluid flow sensing device 24 may be configured as a flow meter, but is not required to be a flow meter.

A non-limiting example of an acceptable strain sensor 34 is a piezoelectric sensor that generates an electrical signal proportional to the degree that the sensor 34 (or at least a portion of the sensor) is mechanically deformed or stressed. A specific non-limiting example of a piezoelectric sensor that may be used for the present disclosure is part number 1-1002405-0, LDT4-028K, manufactured by Measurement Specialties, Inc.

The signals from the array 32 of strain sensors may be provided to a processing unit 36, which processes the aforesaid signals (e.g., diagrammatically shown as "$P_1(t)$-$P_N(T)$ in FIG. 2). The signals may be processed to determine one or more parameters of the fluid flow; e.g., volumetric fluid flow rate, fluid consistency or composition, fluid density, fluid Mach number, the size of particles traveling in the fluid, fluid air/mass ratio, fluid mass flow and/or the percentage of entrained air within a liquid or slurry, or the speed of sound (SOS) of acoustical disturbances or sound waves propagating through the fluid flow.

U.S. Pat. Nos. 6,862,920; 6,813,962; 7,058,549; 7,062,976; 7,121,152; 7,127,360; and 7,165,464 disclose examples of clamp-on fluid flow sensing devices that may be used with and/or modified according to the present disclosure. These patents disclose apparatus and methodologies for processing the strain sensor signals to measure the aforesaid unsteady pressures and subsequently determine fluid flow parameters such as those listed above. U.S. Pat. Nos. 6,862,920; 6,813,962; 7,058,549; 7,062,976; 7,121,152; 7,127,360; and 7,165,464 are each hereby incorporated by reference in its entirety. The present disclosure is not limited to the apparatus and methodologies disclosed within the aforesaid patents, and may be used with other clamp-on fluid flow sensing devices 24 that utilize one or more strain sensors to detect and measure strain within a pipe wall. The fluid flow sensing devices disclosed in the U.S. Patents listed above do not, however, account for pipe wall strain associated with vibrational bending modes. The present disclosure, which accounts for pipe wall strain associated with bending vibrations, does account for such strain and therefore represents a substantial improvement over the disclosures of the aforesaid patents and other similar fluid flow sensing devices.

Figure 3:
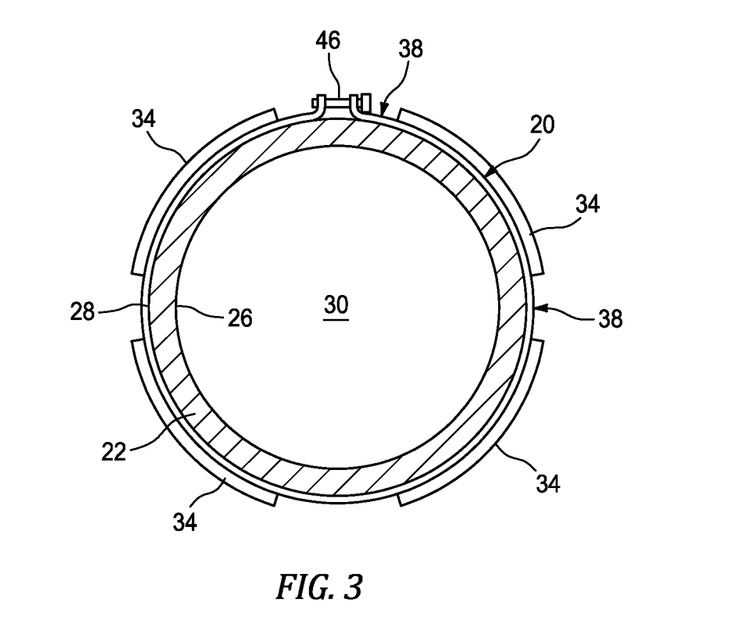
FIG. 3 is a diagrammatic cross-sectional view of a pipe with an array of sensors and a clamp device, with the sensors attached to the outside of the clamp device.
Figure 4:
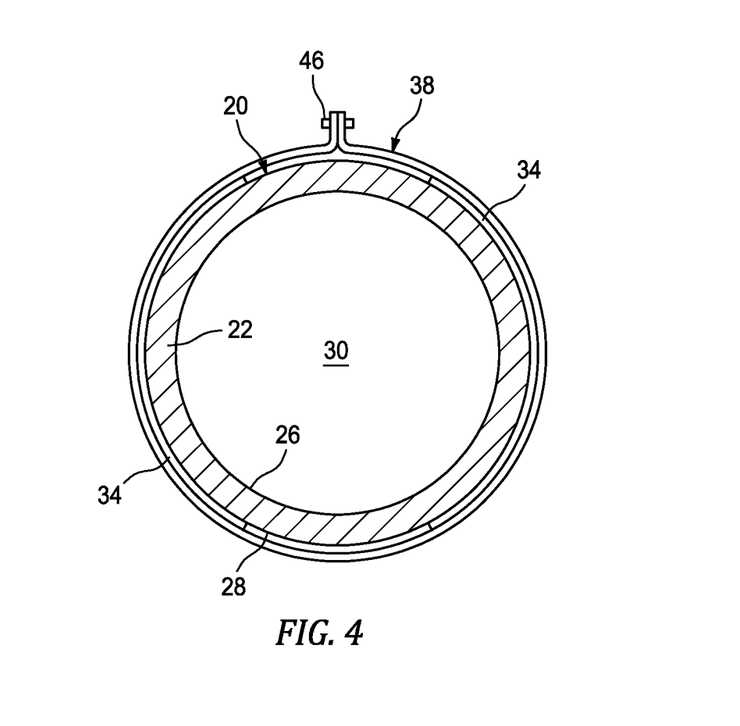
FIG. 4 is a diagrammatic cross-sectional view of a pipe with an array of sensors and a clamp device, with the sensors disposed between the clamp device and the outer surface of the pipe.
Figure 5:
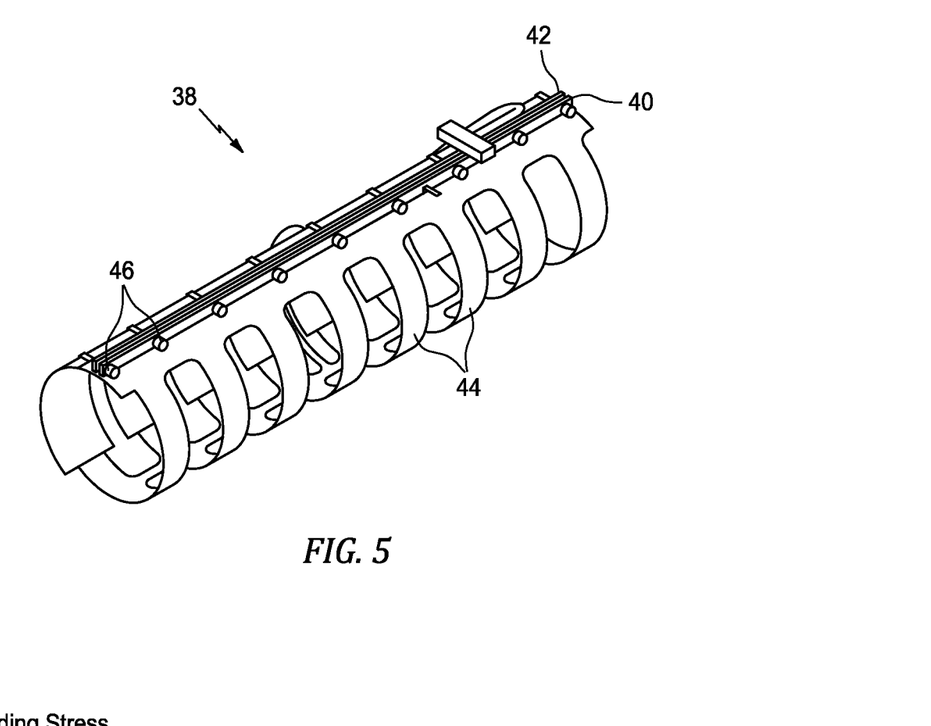
FIG. 5 is a perspective view of a clamp device embodiment.

Strain sensor arrays such as those disclosed in the above listed patents are typically held in close communication with the outer surface 28 of the pipe 20 by a clamp device 38. The clamp device 38 is typically a strap type device (sometimes referred to as a band device) configured to extend around the circumference of the outer diameter pipe surface 28. The strap(s) extends between a first end and a second end and one or more fasteners (e.g., bolts) are used to draw the first and second ends of the strap(s) toward one another, and thereby securing the clamp device to the outer diameter surface 28. The strain sensors 34 may be attached to the outer surface of the clamp device 38 (e.g., see FIG. 3). In this configuration, the straps are held tightly against the pipe outer surface 28 and strain within the pipe wall 22 can be sensed through the respective strap. Alternatively, the strain sensors 34 may be disposed between the clamp device straps and the pipe outer surface 28 (see FIG. 4) and are securely held in place by the straps. FIG. 5 illustrates an exemplary clamp device 38 having a first attachment spine 40, a second attachment spine 42, and a plurality of independent straps 44 that extend between the respective spines. When the clamp device 38 is disposed on a pipe 20, the first and second attachment spines 40, 42 are separated from one another but are disposed in proximity to one another. A plurality of fasteners (e.g., bolts 46) extend between the first and second attachment spines 40, 42, and are used to draw the first and second attachment spines 40, 42 toward one another and thereby secure the clamp device 38 to the outer diameter surface 28 of the pipe 20. In all of these embodiments, the clamp device 38 has an asymmetric configuration; i.e., the weight of the clamp device 38 is not symmetrically distributed around the circumference of the pipe 20 (e.g., the attachment splines 40, 42 are disposed on one side), and the strain sensor itself does not extend over the full circumference of the pipe, and thus, the strain field measured is in general not orthogonal to a predominant elastic axis of the collective bending vibrations.

Apparatus of the present disclosure may include one or more processing units 36. In some embodiments, one or more processing units 36 are included as part of a fluid flow sensing device 24; e.g., in communication (directly or indirectly) with the array 32 of strain sensors 34. In some embodiments, the present disclosure may include one or more processing units 36A in addition to those disposed within the fluid flow sensing device 24; e.g., independent of the fluid flow sensing device 24 and may be in communication therewith. In some embodiments, one or more of the aforesaid processing units 36, 36A may be in communication with one or more vibration sensors 48; See FIG. 12.

The processing unit 36, 36A may include any type of computer, computing device, computational circuit, or any type of processing circuit capable of executing a series of instructions that are stored in a memory device. The processing unit 36, 36A may include one or more processors and/or multicore CPUs; e.g., microprocessor, a digital signal processor, a co-processor, a micro-controller, a microcomputer, a central processing unit, a field programmable gate array, a programmable logic device, logic circuitry, analog circuitry, digital circuitry, etc., and any combination thereof. The instructions stored in the memory device may represent logic instructions (e.g., commands), one or more algorithms, etc., for operating some or all of the fluid flow sensing device 24 and/or the vibration sensor 48. The stored instructions are not limited to any particular form (e.g., program files, system data, buffers, drivers, utilities, system programs, etc.) provided they can be executed by the processing unit. The memory device may be a non-transitory computer readable storage medium configured to store instructions that when executed by the processing unit, cause the processing unit to perform or cause the performance of certain functions or commands. The memory device may be a single memory device or a plurality of memory devices. The memory device may include read-only memory, random access memory, volatile memory, non-volatile memory, static memory, dynamic memory, flash memory, cache memory, and/or any device that stores digital information.

Figure 6:
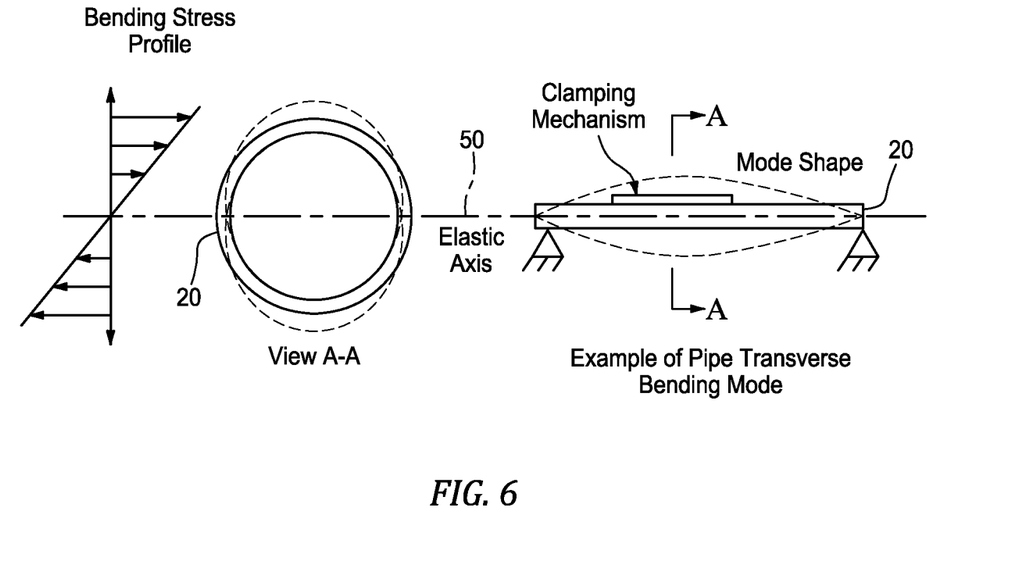
FIG. 6 is a diagram of a pipe shown in an end view and a side view, illustrating vertical vibrational bending modes about an elastic axis, and consequent bending strain.
Figure 7:
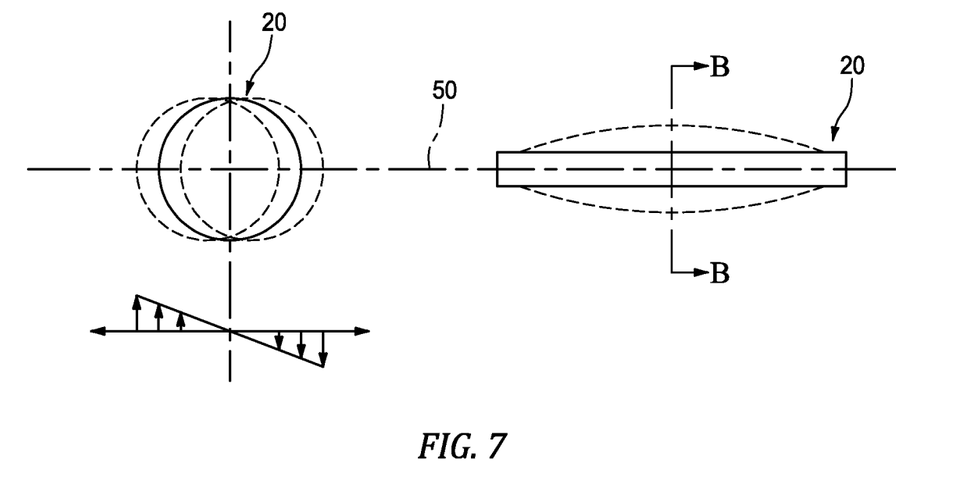
FIG. 7 is a diagram of a pipe shown in an end view and a top view, illustrating horizontal vibrational bending modes about an elastic axis, and consequent bending strain.

As stated above, a pipe 20 within a piping network may be subject to bending vibrations about one of more elastic axes, which bending vibrations may occur during operation of the piping network. Collectively, the bending vibrations and their respective elastic axes may be described collectively as bending vibrations about a predominant elastic axis 50. The bending strain in a cylindrical pipe (without an attached sensor array and clamp device) is symmetric about the predominant elastic axis 50. FIG. 6 diagrammatically illustrates bending vibrations along a horizontal axis. FIG. 7 diagrammatically illustrates bending vibrations along a vertical axis. Strain sensors that measure a full circumferential average of the strain field are therefore nominally orthogonal to any bending vibration in a conduit with a symmetric cross section, such as a pipe. In other words, the net strain measured by an axisymmetric strain sensor (i.e., a strain sensor that measures a circumferentially averaged strain signal around the entire circumference of the pipe) would be zero. Thus, ideally, the symmetric strain sensors 34 would be orthogonal to any transverse bending vibration in the pipe. This "spatial filtering" of bending vibrations helps improve the ratio of strain signal component associated with pressure variations to strain signal components not directly associated with pressure variations within the pipe 20; i.e., strain signal components associated with vibrational bending.

However, as described above most fluid flow sensing devices 24 utilize an array 32 of strain sensors 34 that do not extend around the entire circumference of the pipe, and utilize a clamp device 38 that is not circumferentially symmetric. In fact, depending on the orientation of the clamp device 38 to the predominant elastic axis 50 of the bending vibrations, the clamp device 38 can increase the sensitivity of strain sensors 34 within the array 32 to structural vibration and thereby impair the measurement of fluid parameters within the pipe 20.

Figure 8A:
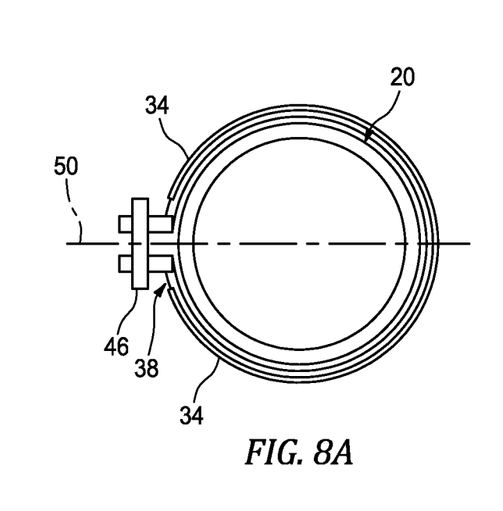
FIG. 8A diagrammatic illustrates a pipe having a sensor array and a clamp device secured to the outer surface of the pipe, wherein the pipe is subject to vertical vibrational modes (perpendicular to the elastic axis) and the asymmetric clamp device is aligned with the elastic axis when the pipe is at rest.
Figure 8B:
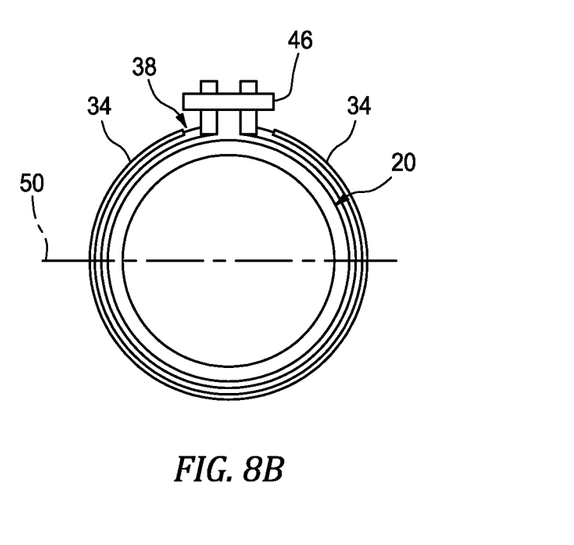
FIG. 8B diagrammatic illustrates a pipe having a sensor array and a clamp device secured to the outer surface of the pipe, wherein the pipe is subject to vertical vibrational modes (perpendicular to the elastic axis) and the asymmetric clamp device is spaced apart from the elastic axis (e.g., aligned with the vibrational direction) when the pipe is at rest.

FIGS. 8A and 8B illustrate the significance of the orientation of the asymmetry of the strain sensors and the clamp device 38 relative to the predominant elastic axis 50 of the bending vibrations to which the pipe is subjected. In FIG. 8A, the strain sensors 34 and the asymmetric clamp device 38 are oriented substantially symmetric to the predominant elastic axis 50; e.g., the asymmetric portion of the clamp device 38 is substantially symmetric relative to the predominant elastic axis 50. In this orientation, the clamp device 38 has minimal response to bending vibrations, and the strain sensor(s) 34 are orthogonally oriented relative to the elastic axis 50. The term "minimal" is used here to mean that the amount of strain attributable to vibration is substantially the least amount of strain relative to all possible circumferential positions of the clamp device 38. Hence, the strain sensor(s) 34 and the clamp device 38 are circumferentially oriented such that the response of the strain sensor(s) 34 to bending vibration about the predominant elastic axis 50 of the bending vibrations is minimal for that clamp device 38. In FIG. 8B, in contrast, the asymmetry of the clamp device 38 is oriented normal to the predominant elastic axis 50, and therefore the asymmetric clamp device 38 is asymmetrically oriented relative to the predominant elastic axis 50. In this orientation, the clamp device 38 is oriented with respect to the predominant elastic axis 50 to have a maximal response to bending vibrations about the denoted predominant elastic axis 50, Hence, the strain sensor(s) 34 and the clamp device 38 are circumferentially oriented such that the response of the strain sensor(s) 34 to bending vibrations about the elastic axis 50 is maximal for that clamp device 38.

The predominant orientation of the elastic axis 50 associated with bending vibrations to which a pipe in a piping network is subjected is typically unique to the specific pipe within the network, and will likely be a function of factors such as pipe boundary conditions, vibrational excitation source, relevant frequency range and the like. According to aspects of the present disclosure, one or more vibration sensors 48 may be used to determine the orientation of the predominant elastic axis 50 associated with the bending vibrations to which the pipe is subjected. After the orientation of the predominant elastic axis 50 is determined, the strain sensor array 32 and clamp device 38 can be attached to the outer surface 28 of the pipe 20 in a circumferential orientation relative to the predominant elastic axis 50 so that the clamp device 38 has minimal response to bending vibrations, and the strain sensor(s) 34 are substantially orthogonally oriented relative to the predominant elastic axis 50.

Figure 9:
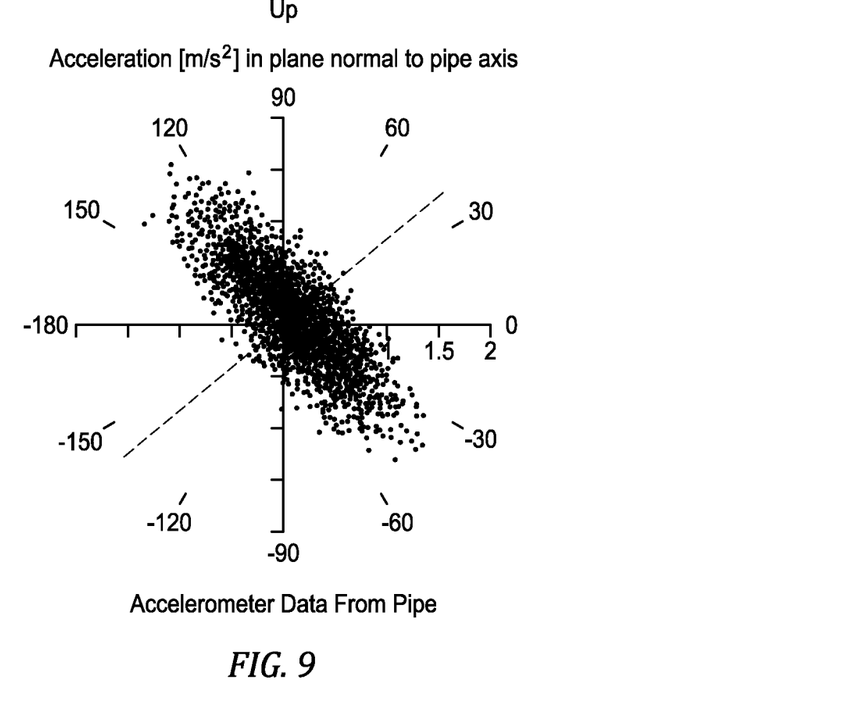
FIG. 9 is a plot of accelerometer data points indicating direction of acceleration and magnitude away from a neutral position, and the elastic axis relative to the collective data points.

According to aspects of the present disclosure, one or more vibration sensors 48 are utilized to determine the vibrational characteristics of the pipe 20. The predominant elastic axis 50 of the collective bending vibrations can be determined from the sensed vibrational characteristics. Each vibration sensor 48 is configured to sense and produce signals (e.g., electric signals) representative of bending vibrations of the pipe 20. The vibration sensor 48 itself may be configured to produce information indicative of the orientation and magnitude of bending vibrations of the pipe 20, or the signal output from the vibration sensor(s) 48 can be used to determine the orientation and magnitude of bending vibrations of the pipe 20. An exemplary vibration sensor 48 may include one or more accelerometers configured to sense the direction and magnitude of pipe bending vibrations. The present vibration sensors are not limited to accelerometer type sensors. Alternative vibrational sensor types include localized strain sensors of strain gauges, or laser-based optical vibration sensors, or the like. FIG. 9 illustrates an exemplary plot of accelerometer data points in a plane normal to the fluid flow axis of a pipe 20, which pipe 20 is subject to bending vibrations. Based on this accelerometer data the orientation of a predominant elastic axis 50 can be determined.

The orientation of a predominant elastic axis can be determined using several methods. For example, in some instances the predominate elastic axis may be determined visually based on a plot of the acceleration data as shown in FIG. 9; i.e., the predominant elastic axis 50 may be visually determined to coincide with an axis through the center of the vibration data for which the plot of the vibration data would have the largest first moment of area. A visual based determination may be based on a visual representation of the sensor data on a display 52, or a document produced by a printer 54, or the like, in communication with the processing unit 36, 36A (see FIG. 12).

Alternatively, a variety of mathematical algorithms could be used to determine the orientation of the predominant elastic axis. For example, one embodiment of the proposed methodology would be to convert a measured time history of two components of acceleration, denoted in the equations below as x and y components, associated with the cross-sectional vibration of a pipe, the acceleration data into the frequency domain. The aforesaid components could then be converted into pipe displacement in the frequency domain, by dividing the Fourier components of the acceleration by the square of the frequency. Then, using only frequency components relevant for the interpretation of the strain data in terms of the desired fluid parameter (e.g., 5 to 40 Hz may be a relevant range for a fluid flow measurement), reconstruct the each of the components of the displacement field. Next, find the centroid of the x and y displacements; e.g., using Equation 1 below:

$$\bar{x} = \frac{1}{N}\sum_{i=1}^{N} x_i \quad \bar{y} = \frac{1}{N}\sum_{i=1}^{N} y_i \quad \text{(Eqn. 1)}$$

The first moment of the displacement data can then be calculated about an axis inclined to the original x axis, defined as in this example as the horizontal axis. A rotational transformation can then be used to convert each x and y displacement data point into a distance (e.g., y'(θ)) from an axis oriented at a counter clockwise angle from the original x-axis:

$$y'_i(\theta) = -x_i \sin(\theta) + y_i \cos(\theta) \quad \text{(Eqn. 2)}$$

The first moment of the displacement about an axis oriented at angle θ (from 0 to π) to the original x-axis can be calculated, for example using Equation 3:

$$I_{x'}(\theta) = \frac{1}{N}\sum_{i=1}^{N} ((-(x_i - \bar{x})\sin(\theta) + (y_i - \bar{y})\cos(\theta))^{\wedge}2) \quad \text{(Eqn. 3)}$$

Figure 10:
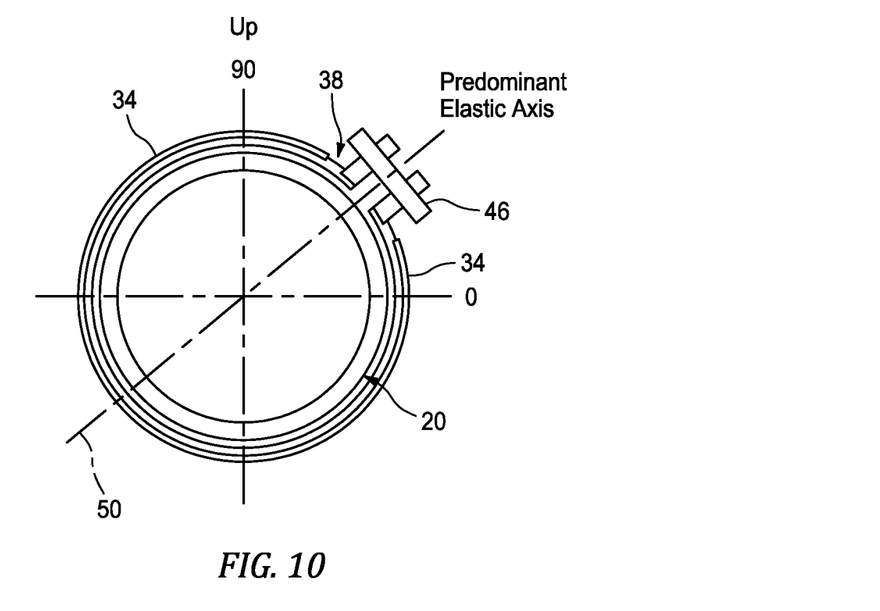
FIG. 10 illustrates a pipe having a sensor array and a clamp device secured to the outer surface of the pipe, wherein the asymmetric clamp device is aligned with the elastic axis when the pipe is at rest.

The predominant elastic axis of the vibration axes is defined as the axis oriented such that it maximizes the first moment of displacement as defined above. FIG. 13 schematically illustrates the aforesaid rotational transformation. Once the orientation of the elastic axis 50 is determined, the strain sensor array 32 and the clamp device 38 can be oriented on the outer surface 28 of the pipe 20 so that strain sensor array 32 is substantially symmetrical relative to the elastic axis 50 as shown in FIG. 10. In this orientation, the strain sensor(s) 34 are orthogonally oriented relative to the elastic axis 50 and the clamp device 38 is oriented such that the response of the strain sensor(s) 34 to bending vibration about the elastic axis 50 is minimal for that clamp device 38. An algorithmic solution for determining the orientation of the predominant elastic axis 50, including but not limited to the above described algorithms, may be provided in the executable instructions stored within a memory device in communication with a processing unit 36, 36A (see FIG. 12).

According to some aspects of the present disclosure, a method for mitigating the signal to noise ratio ("SNR") of pipe wall strain measurements is provided. The method includes using one or more vibration sensors 48 to sense the pipe 20 for vibrations, and produce signals representative of the orientation and magnitude of the pipe bending vibrations. The vibration sensor data is used to determine associated predominant elastic axis 50. Once the orientation of the elastic axis 50 is determined, the strain sensor array 32 and the clamp device 38 can be oriented and secured on the outer surface 28 of the pipe 20 so that strain sensor array 32 is oriented substantially symmetric to the predominant elastic axis 50.

Figure 12:
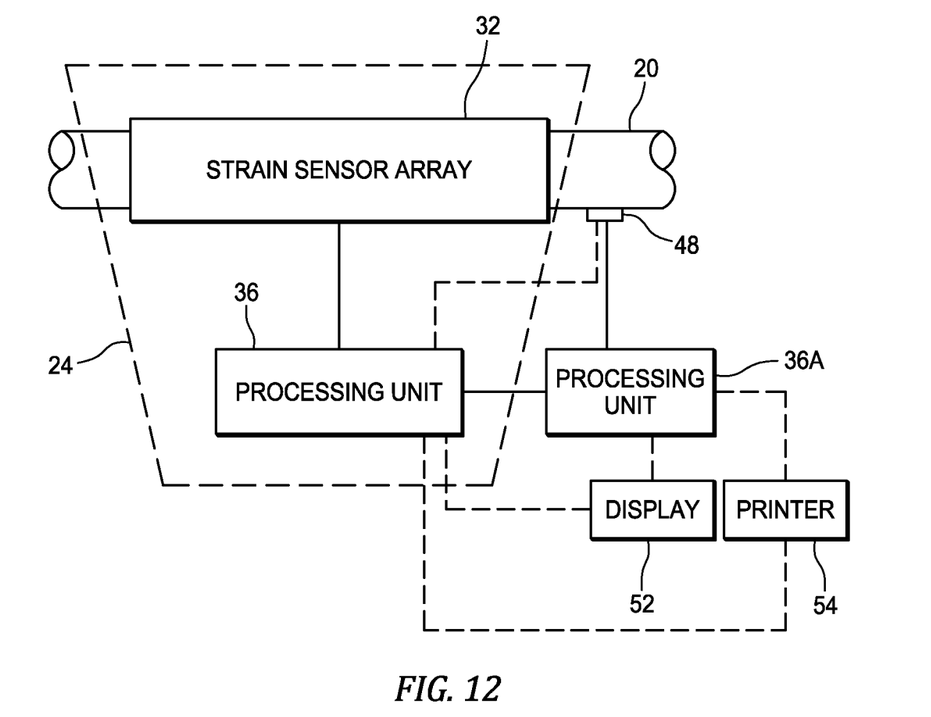
FIG. 12 is a diagrammatic illustration of a fluid flow sensing device and a vibration sensor disposed along a pipe.
Figure 13:
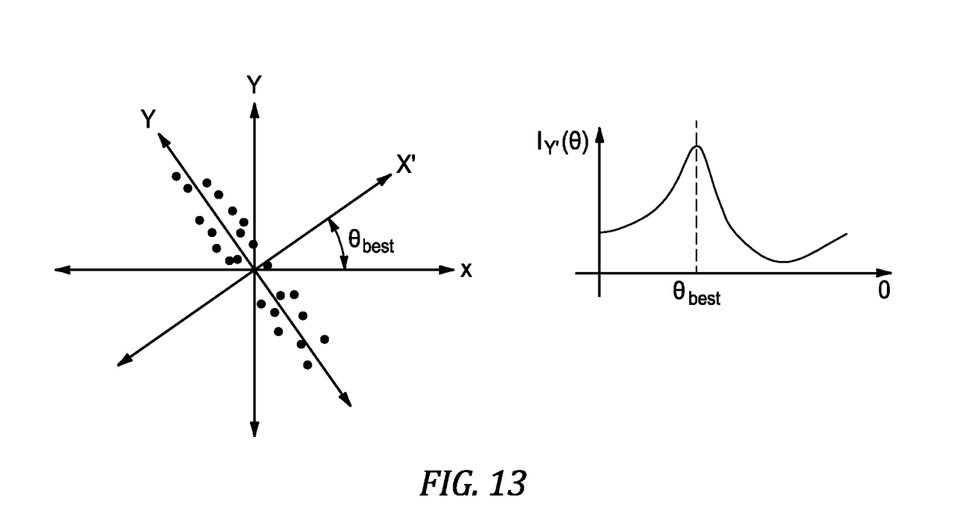
FIG. 13 is a schematic illustration of a rotation coordinate system to determine a predominant axis of vibration for a rotational data set.

Referring to FIG. 12, according to some aspects of the present disclosure, an apparatus for measuring at least one parameter of a fluid flowing within a pipe 20 is provided. The apparatus includes a fluid flow sensing device 24 as described above modified to include, or be in communication with, one or more vibration sensors 48 configured to measure pipe vibrations, and the vibrational bending modes associated therewith. The fluid flow sensing device 24 includes a strain sensor array 32 having one or more strain sensors 34 (e.g., see FIG. 2) disposed at two or more axial positions, and a processing unit(s) 36 in communication with the strain sensor array 32. As described above, the one or more vibration sensors 48 may be in communication with the processing unit(s) 36 of the fluid flow sensing device 24, or in communication with one or more processing units 36A independent of the fluid flow sensing device 24, and one or more of those processing units 36A may be in communication with fluid flow sensing device 24, or any combination thereof.

Figure 11:
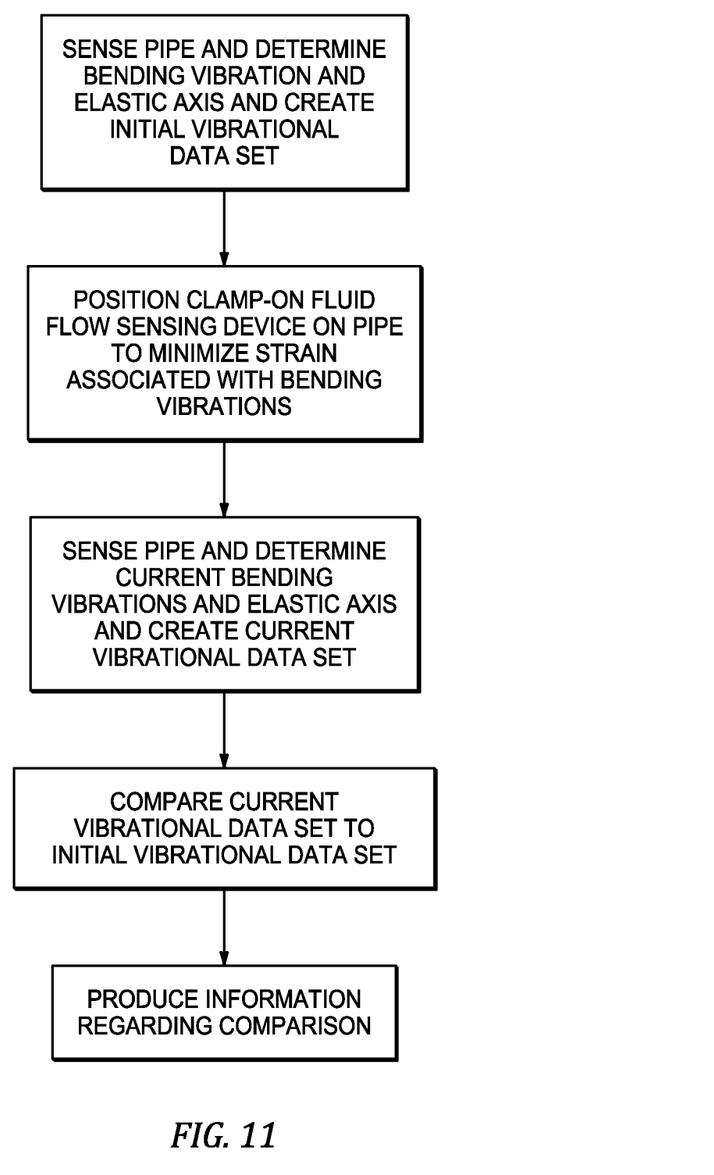
FIG. 11 is a flow chart directed to an embodiment of the present disclosure.

Referring to FIG. 11, in some applications of the apparatus, prior to the apparatus being installed to measure at least one parameter of a fluid flowing within a pipe 20, the predominant elastic axis 50 associated with bending vibrations may be determined. The data collected from the vibrational sensors 48 and the determined predominant elastic axis 50 may be stored for subsequent use as described herein. The strain sensor array 32 and clamp device 38 can then be installed as described above so that strain sensor array 32 is substantially symmetrical relative to the predominant elastic axis 50, and therefore substantially orthogonal to any transverse bending vibration in the pipe 20, and the clamp device 38 installed in a circumferential orientation to minimize strain associated with bending vibrations. During operation of the apparatus, the vibrational sensors 48 may be operated periodically (or on command) to determine then current vibrational bending modes of the pipe 20 and associated elastic axis 50. The stored vibrational analysis data may then be compared with the current vibrational analysis data to confirm agreement or to provide data to the operator of any disagreement. A difference between an earlier vibrational analysis data set and a current vibrational analysis data may indicate a change in the bending vibrations to which the pipe 20 is subjected (e.g., new or differential vibrational stimuli), and the predominant elastic axis associated therewith. If the difference is significant (e.g., beyond one or more predetermined threshold values), the apparatus may be configured to produce information to the operator regarding the difference. In response thereto, the operator may reorient the strain sensor array 32 and/or the clamp device 38 on the pipe 20 to avoid strain sensor signals not representative of pressure fluctuations within the pipe 20 attributable to the fluid flow. Hence, the present apparatus may be used in a system performance evaluation capacity to ensure accurate fluid flow parameter analysis.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

While the present disclosure has been described with reference to several exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment(s) disclosed herein as the best mode contemplated for carrying out this invention.

What is claimed is:

1. A method of decreasing vibrational sensitivity of strain based measurements of fluid flow parameters for a fluid flow in a conduit, comprising:
    using at least one vibrational sensor to sense a conduit to determine vibrational characteristics of the conduit;
    determining a predominant elastic axis using the measured vibrational characteristics; and
    securing a strain sensor array to an outer surface of the conduit, the strain sensor array having a plurality of strain sensors disposed at different axial positions of the conduit, the strain sensor array secured to the outer surface of the conduit at a position so that the strain sensor array is oriented substantially symmetric with respect to the determined predominant elastic axis.

2. The method of claim 1, wherein the strain sensor array is secured to the outer surface of the conduit using a clamp device, and further comprising:
    circumferentially orienting the clamp device relative to the conduit at a position so that the clamp device is substantially symmetric with respect to the determined predominant elastic axis.

3. The method of claim 2, wherein the clamp device is asymmetric and the asymmetry of the clamp device is positioned substantially symmetric with respect to the determined predominant elastic axis.

4. The method of claim 3, wherein the at least one vibrational sensor includes an accelerometer.

5. The method of claim 1, wherein the vibrational characteristics include bending vibrations.

6. The method of claim 1, wherein the determining said predominant elastic axis includes producing a visual display of a plot of the vibrational characteristics.

7. The method of claim 1, wherein the conduit is a cylindrical pipe.

8. The method of claim 1, wherein the vibrational characteristics of the conduit are sensed at a first point in time and form a first set of vibrational characteristics, and the predominant elastic axis is determined using the first set of vibrational characteristics; and further comprising:
    using the at least one vibrational sensor to sense the conduit to determine a second set of vibrational characteristics of the conduit, the second set of vibrational characteristics sensed at a second point in time, which second point in time is later than the first point in time;
    determining a second predominant elastic axis using the second set of vibrational characteristics sensed at a second point in time; and
    comparing the second set of vibrational characteristics to the first set of vibrational characteristics.

9. The method of claim 8, further comprising reporting a difference between the second set of vibrational characteristics and the first set of vibrational characteristics.

10. The method of claim 8, further comprising comparing the second predominant elastic axis to the predominant elastic axis.

11. The method of claim 10, further comprising reporting a difference between the second predominant elastic axis and the predominant elastic axis.

12. An apparatus for measuring one or more fluid flow parameters for a fluid flow in a conduit, comprising:
- one or more vibration sensors configured to sense a conduit to determine vibrational characteristics of the conduit; and
- a fluid flow sensing device having a strain sensor array configured to be secured to an outer surface of the conduit, the strain sensor array having a plurality of strain sensors disposed at different axial positions of the conduit;
- wherein the strain sensor array is secured to the outer surface of the conduit at a position so that the strain sensor array is oriented substantially symmetric with respect to an elastic axis of the vibrational characteristics of the conduit.

13. The apparatus of claim 12, wherein the elastic axis is a predominant elastic axis of the vibrational characteristics of the conduit.

14. The apparatus of claim 13, further comprising an asymmetric clamp device configured to secure the strain sensor array the outer surface of the conduit;
- wherein the asymmetric clamp device is positioned relative to the conduit at a position so that the asymmetry of the clamp device is substantially symmetric with respect to the determined predominant elastic axis.

15. The apparatus of claim 12, wherein the one or more vibrational sensors include an accelerometer.

16. The apparatus of claim 12, further comprising a display device configured to produce a visual display of a plot of the vibrational characteristics.

17. The apparatus of claim 12, wherein the conduit is a cylindrical pipe.

18. An apparatus for measuring one or more fluid flow parameters for a fluid flow in a conduit, comprising:
- one or more vibration sensors configured to sense a conduit to determine vibrational characteristics of the conduit;
- a processing unit in communication with the one or more vibration sensors and a memory device storing instructions, the instructions when executed cause the processing unit to determine a predominant elastic axis based on the determined vibrational characteristics;
- a fluid flow sensing device having a strain sensor array configured to be secured to an outer surface of the conduit, the strain sensor array having a plurality of strain sensors disposed at different axial positions of the conduit;
- wherein the strain sensor array is secured to the outer surface of the conduit at a position so that the strain sensor array is oriented substantially symmetric with respect to the predominant elastic axis.

19. The apparatus of claim 18, further comprising an asymmetric clamp device configured to secure the strain sensor array the outer surface of the conduit;
- wherein the asymmetric clamp device is positioned relative to the conduit at a position so that the asymmetry of the clamp device is substantially symmetric with respect to the determined predominant elastic axis.

20. The apparatus of claim 19, wherein the vibrational characteristics of the conduit and the predominant elastic axis are stored in the memory device; and
- wherein the instructions when executed cause the processor to:
  - control the one or more vibrational sensors to sense the conduit to determine second vibrational characteristics of the conduit and store the second vibrational characteristics in the memory device;
  - determine a second predominant elastic axis based on the determined second vibrational characteristics;
  - compare the determined predominant elastic axis to the second predominant elastic axis, or compare the determined vibrational characteristics to the second vibrational characteristics, or both, and report a first result of the comparison between the determined predominant elastic axis and the second predominant elastic axis, or a second result of the comparison between the determined vibrational characteristics and the second vibrational characteristics, or both.

* * * * *